United States Patent [19]
Lucas et al.

[11] Patent Number: 5,644,759
[45] Date of Patent: Jul. 1, 1997

[54] APPARATUS AND METHOD FOR PROCESSING A JUMP INSTRUCTION PRECEDED BY A SKIP INSTRUCTION

[75] Inventors: Gary J. Lucas, Pine Springs; Ronald G. Arnold, Apple Valley, both of Minn.

[73] Assignee: Unisys Corporation, Blue Bell, Pa.

[21] Appl. No.: 375,219

[22] Filed: Jan. 19, 1995

[51] Int. Cl.$^6$ ........................................ G06F 9/42
[52] U.S. Cl. .................. 395/587; 364/938.1; 364/261.4
[58] Field of Search ............................... 395/375, 800, 395/775, 587, 580, 584

[56] References Cited

U.S. PATENT DOCUMENTS

| | | | |
|---|---|---|---|
| 4,370,711 | 1/1983 | Smith | 395/587 |
| 5,008,807 | 4/1991 | Krueger et al. | 395/375 |
| 5,155,843 | 10/1992 | Stamm et al. | 395/575 |
| 5,434,986 | 7/1995 | Kuslak et al. | 395/375 |

*Primary Examiner*—David Y. Eng
*Attorney, Agent, or Firm*—Charles A. Johnson; Mark T. Starr

[57] ABSTRACT

Disclosed is a system for improved instruction fetch prediction. When a jump instruction is encountered, the preceding instruction is considered in predicting the next instruction to fetch. If the preceding instruction is a skip instruction, the result of evaluating a condition specified by the skip instruction is used in predicting the next instruction to fetch. Prediction designators for skip/jump sequences of instructions are maintained in a jump prediction RAM.

10 Claims, 8 Drawing Sheets

APPARATUS AND METHOD FOR PROCESSING A JUMP INSTRUCTION PRECEDED BY A SKIP INSTRUCTION

BACKGROUND

1. Field of the Invention

This invention generally relates to predicting the address of the next instruction to fetch after a branch or jump instruction is fetched, and more particularly to predicting the address of the next instruction to fetch after a jump instruction has been fetched where the jump instruction is preceded by a skip instruction.

2. Background

Prediction mechanisms are used in computer systems to predict the address of the next instruction to fetch for execution when the present instruction is a BRANCH or JUMP instruction. For the remainder of this specification the JUMP instruction is used to connote both BRANCH and JUMP instructions. The objective of the prediction mechanism is to increase instruction processing throughput by having the next instruction to be executed available for processing before a condition in the JUMP instruction has been evaluated. Processor time may be saved by not having to wait for the next instruction to be fetched following execution of a JUMP instruction.

Generally speaking, the prediction made must be correct more often than not in order for the JUMP prediction to achieve its objective of achieving increased processor performance. This is because of the lost processing time associated with mispredicting the next instruction. If a misprediction occurs, the predicted instruction must be aborted and the correct instruction must be fetched. In a pipelined machine where a condition in a JUMP instruction is not evaluated until late in the pipeline, instructions following the predicted instruction may have been loaded and have to be aborted also.

To achieve a desired rate of correct predictions, JUMP prediction mechanisms rely on the principle that a JUMP instruction is likely be evaluated the same as its most recent executions, and therefore the instruction to follow the JUMP instruction is predicted to be the same as in recent executions.

SUMMARY OF THE INVENTION

Even though it may be generally true that past executions of a JUMP instruction are good indicators for predicting the next instruction, instruction sequences may arise where strict adherence to the principle may decrease rather than increase instruction processing throughput. For example, some instruction repertoires include an UNCONDITIONAL JUMP instruction and various SKIP instructions. The UNCONDITIONAL JUMP instruction specifies an address that identifies the next instruction to perform. The SKIP instruction typically specifies a condition, and if the condition is satisfied, the following instruction is skipped. For example, if the SKIP instruction is at address N−1 and the condition is satisfied, the next instruction to execute is at address N+1.

When an UNCONDITIONAL JUMP instruction is encountered, normal JUMP prediction mechanisms may presume that the target address specified in the instruction should always be predicted as the next instruction because execution of the target instruction is not dependent upon any condition set forth in the JUMP instruction. This presumption may be valid in some cases. However, there are instruction sequences where the presumption is invalid and the result is wasted processor time. The wasted processor time results from having to recover from a misprediction, i.e., having to abort instructions in process that should not be executed.

An example code sequence giving rise to this anomaly is an UNCONDITIONAL JUMP instruction that is preceded in instruction address space by an SKIP instruction. Existing JUMP prediction schemes are typically triggered by a JUMP instruction. The prediction of the next instruction to execute is made based on past executions of the JUMP instruction. In the case of an UNCONDITIONAL JUMP instruction, the history of the UNCONDITIONAL JUMP instruction itself would indicate to always predict to fetch the target instruction as the next to execute. This scheme may fail where the UNCONDITIONAL JUMP instruction follows a SKIP instruction because the condition in the SKIP instruction may be true, in which case the UNCONDITIONAL JUMP instruction is to be skipped.

The example above involved an UNCONDITIONAL JUMP instruction preceded by a SKIP instruction. However, incorrect jump prediction for a CONDITIONAL JUMP that is preceded by a SKIP instruction may similarly result in lost processor time.

Therefore it would be desirable to consider the instruction that precedes a JUMP instruction for the purpose of making a prediction as to the next instruction to execute.

It is an object of the invention to increase the instruction processing throughput of a data processing system.

A further object is to consider the instruction that precedes a JUMP instruction in making a prediction as to the next instruction to fetch.

Another object is to detect a SKIP instruction that precedes a JUMP instruction and make a prediction as to the instruction to fetch after the JUMP instruction.

Yet another object is to minimize the logic required to make a prediction as to the instruction to fetch after JUMP instruction has been fetched where the JUMP instruction is preceded by a SKIP instruction.

A further object of the invention is to make a prediction of an instruction to fetch after an UNCONDITIONAL JUMP instruction is fetched where the UNCONDITIONAL JUMP is preceded by a SKIP instruction.

The foregoing and other objects are attained in a data processing system having a pipelined instruction processor. When a JUMP instruction is encountered, the preceding instruction is considered in performing JUMP prediction. If the preceding instruction is a SKIP, the prediction for the next instruction to fetch is based upon past executions of the SKIP/JUMP instruction sequence, rather than on past executions of only the JUMP instruction. This is because the result of evaluating the condition specified in the SKIP instruction ultimately determines whether the target of the JUMP instruction is fetched next.

A jump prediction RAM is used to track the history of JUMP instructions. If a SKIP/JUMP sequence is encountered, the evaluation of the SKIP condition is also used to update the jump prediction RAM at the location associated with the JUMP. This allows use of the SKIP evaluation to be used for subsequent executions of the SKIP/JUMP sequence of instructions. If the evaluation of the SKIP condition is true, the JUMP instruction is aborted and the jump prediction RAM is updated so that on the next execution of the SKIP/JUMP sequence the next instruction predicted to be executed is the instruction following the JUMP.

Instruction processing throughput is enhanced by considering the instruction that precedes a JUMP instruction in making a prediction as to the instruction to fetch following JUMP instruction. A better rate of jump prediction may be achieved by considering whether a JUMP instruction is preceded by a SKIP instruction. Furthermore, logic is saved by not implementing a separate skip prediction RAM that is analogous to the jump prediction RAM.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

Figure 1:
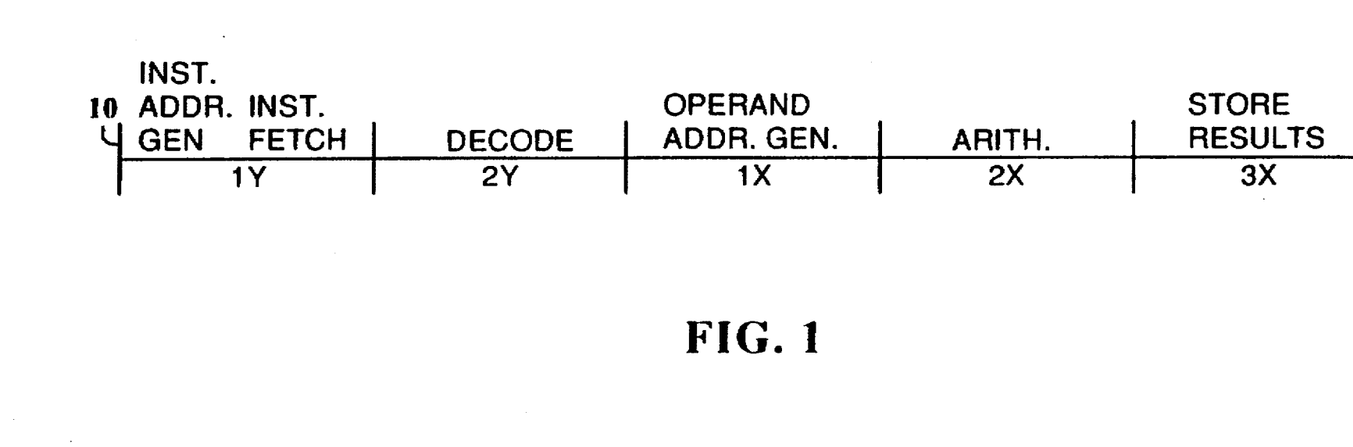
FIG. 1 shows the stages of an exemplary instruction Pipeline.

FIG. 1 shows the stages of an exemplary instruction Pipeline 10. The pipeline shown is implemented in the 2200 Series data processing systems available commercially from Unisys Corporation. The pipeline consists of five stages denoted 1Y, 2Y, 1X, 2X, and 3X. Because the pipeline has five stages, up to five instructions may be in the instruction processing pipeline at once. Each stage of the pipeline takes one major clock cycle to complete. Therefore, under ideal code sequences, execution of an instruction is completed every major clock cycle.

Two major functions are performed in the 1Y stage of the Pipeline 10. The first function is to generate the address of the next instruction to execute. This occurs during the first half of the 1Y stage. The second function is to fetch the instruction, which occurs in the second half of the 1Y stage. The fetched instruction is then provided to the second stage, 2Y, of the pipeline, after which the instruction address generation logic identifies the address of the next instruction to fetch.

The 2Y stage decodes the fetched instruction. After the instruction has been decoded and the necessary control established, the third stage, 1X, of the pipeline generates addresses for the operands specified by the instruction. The required operands are also fetched in the 1X stage of the pipeline. Once the operands are obtained, the arithmetic stage, 2X, performs the function of the instruction. In the last stage, 3X, the results of performing the function of the instruction are stored according to the specific instruction.

Figure 2:
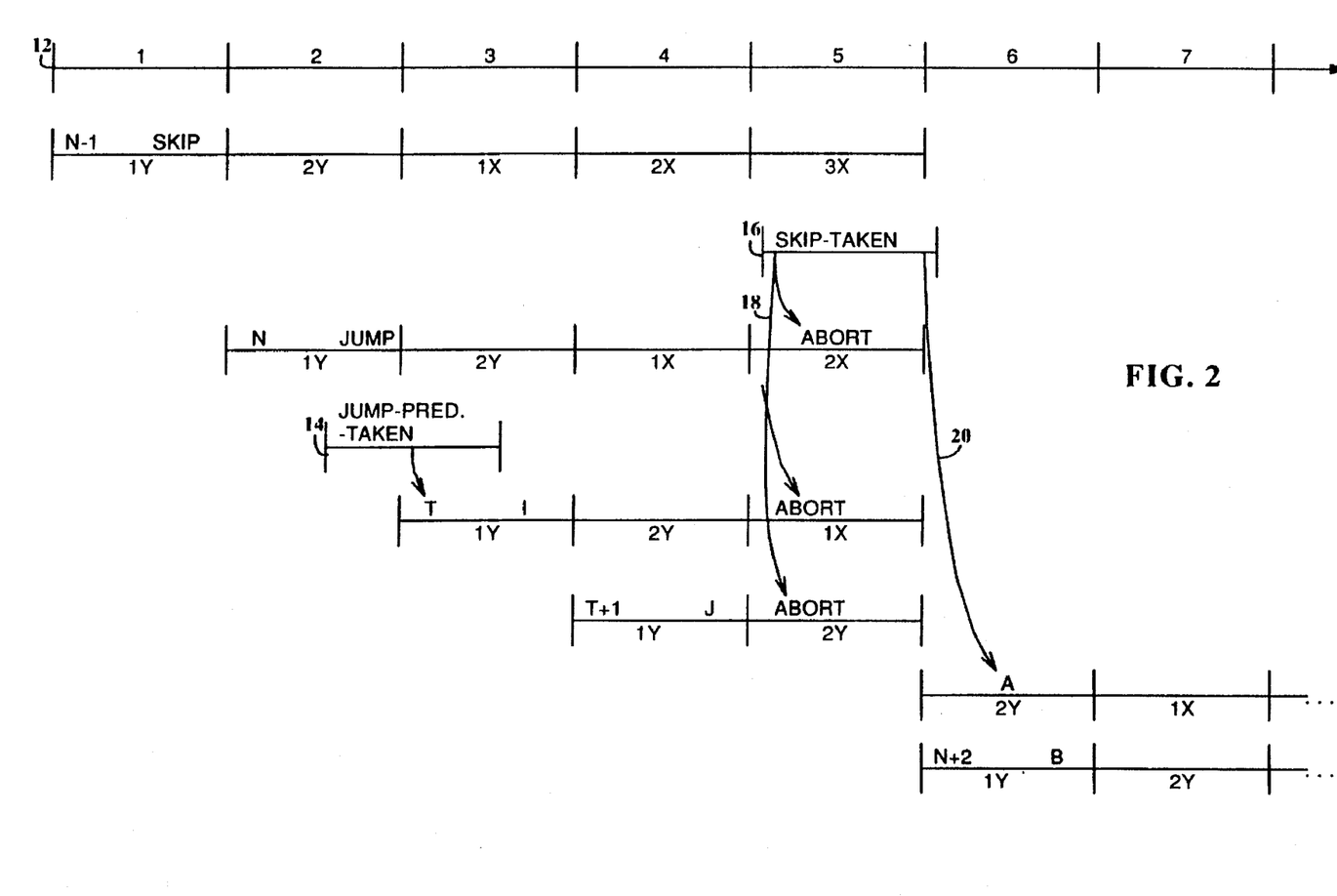
FIG. 2 is a timing diagram that illustrates the effects of mispredicting a JUMP instruction that follows a CONDITIONAL SKIP instruction.
Figure 3:
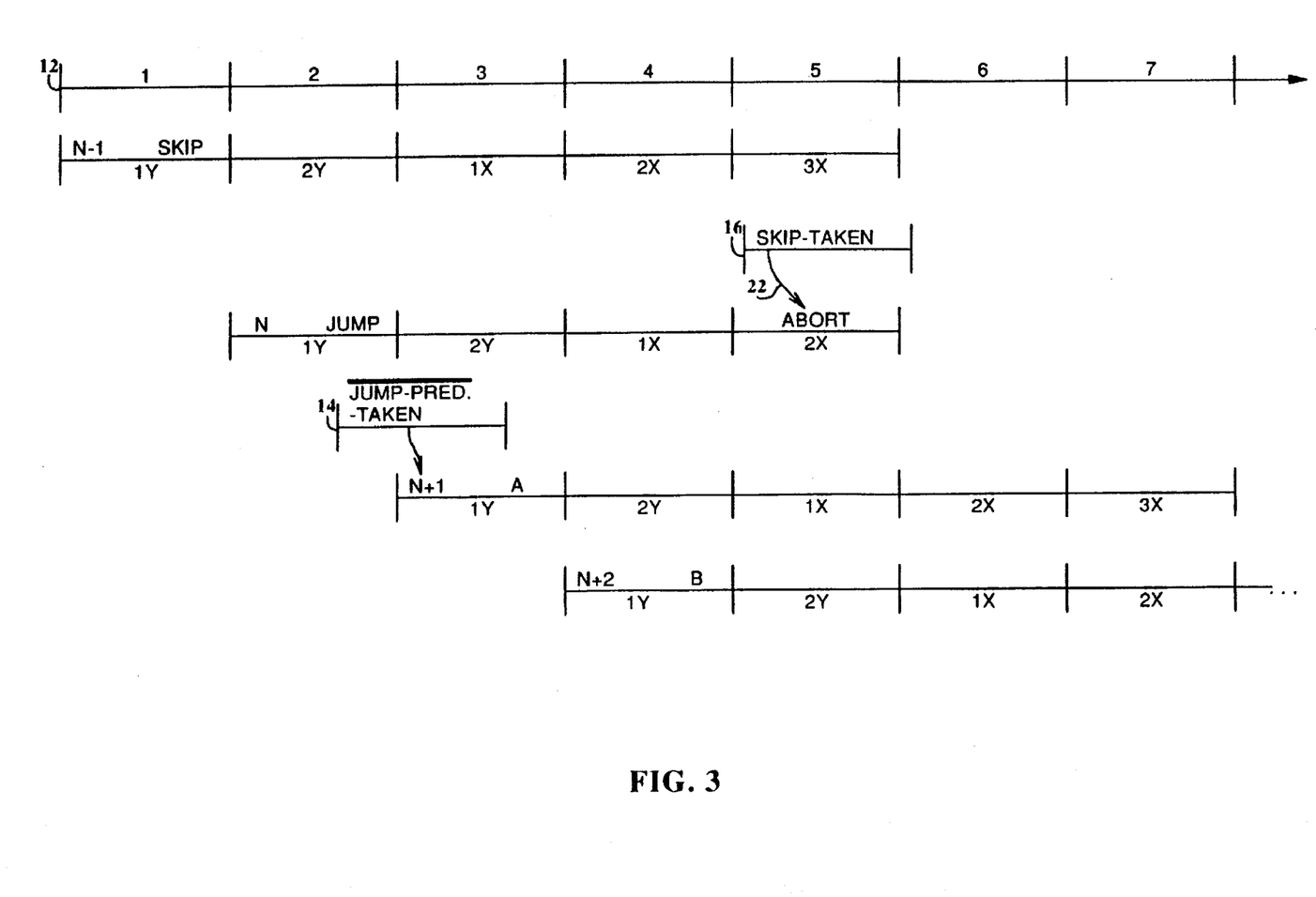
FIG. 3 is a timing diagram that illustrates the benefits of considering the instruction that precedes a JUMP instruction when performing jump prediction.

FIGS. 2 and 3 are timing diagrams that show instruction prefetching and pipelined execution of a CONDITIONAL SKIP instruction followed by a JUMP instruction. The top Line 12 marks seven major clock cycles. Each of the lines below the clock Line 12 marks activated signals and the introduction of a new instruction into the Pipeline 10. A separate line is shown for each of the instructions to illustrate the progression of the instruction through the Pipeline 10 relative to the clock cycles of Line 12.

FIG. 2 is a timing diagram that illustrates the effects of mispredicting a JUMP instruction that follows a CONDITIONAL SKIP instruction. The example of FIG. 2 shows the instruction prefetching and pipelined execution of a CONDITIONAL SKIP instruction followed by a JUMP instruction where jump prediction is utilized to prefetch an instruction without taking into account the possible results of the CONDITIONAL SKIP instruction.

During cycle 1, the address N−1 is generated and a CONDITIONAL SKIP instruction is fetched from address N−1. In cycle 2, a program address counter generates address N for the next instruction to be fetched, and the JUMP instruction is fetched from address N. The CONDITIONAL SKIP instruction is in stage 2Y of the Pipeline 10 during cycle 2 and is decoded at this stage.

After the JUMP instruction has been fetched, a JUMP-PREDICTED-TAKEN Signal 14 is raised during cycle 2 and maintained into cycle 3 so that instruction address generation taking place during cycle 3 predicts that the target address, T, of the JUMP contains the next instruction to fetch. As shown for cycle 3, the address T is generated and the instruction I at address T is fetched. During cycle 3, instruction I (the target) has been fetched, the JUMP instruction is in stage 2Y, and the CONDITIONAL SKIP instruction is in stage 1X.

The address T+1 is generated and instruction J is fetched during cycle 4. At the same time, the CONDITIONAL SKIP instruction is in the Arithmetic stage 2X of the Pipeline 10 and its condition is being evaluated. For this example, the result of the evaluation is that the condition evaluates to true, resulting in the SKIP-TAKEN Signal 16 being activated in cycle 5. Because the condition in the SKIP instruction evaluated to true, the JUMP instruction should have been skipped. Therefore, the JUMP instruction, instruction I, and instruction J must be aborted, collectively illustrated by Line 18. The net result of mispredicting the instruction to fetch after the JUMP instruction is that during cycles 6, 7, and 8 (cycle 8 is not shown because of limited space) no instructions are completing execution.

The SKIP-TAKEN Signal 16 is used to trigger recovery from the misprediction. Because the CONDITIONAL SKIP instruction was at address N−1, an active SKIP-TAKEN signal results in instruction A being inserted to stage 2Y of the Pipeline 10 in cycle 6. Line 20 shows the influence of the SKIP-TAKEN Signal. The pipeline logic is able to insert instruction A because it was fetched as an alternate instruction to instruction I during cycle 5. During cycle 5, the JUMP instruction in the 2X stage of processing. Instruction A at address N+1 is fetched as the alternate because the jump prediction logic predicted that the target instruction should be fetched. Had address N+1 been predicted, instruction I at address T would have been fetched as the alternate instruction. It should be noted that even though the Pipeline 10 of FIG. 1 shows only one instruction fetch during cycle 1Y, a major cycle is long enough to allow two instructions to be fetched. This allows for fetching the instruction from the address that was not predicted. During cycle 6, address N+2 is generated and instruction B is fetched.

FIG. 3 is a timing diagram that illustrates the benefits of considering the instruction that precedes a JUMP instruction when performing jump prediction. The timing diagram of FIG. 3 shows the instruction prefetching and pipelined execution of a CONDITIONAL SKIP instruction followed by a JUMP instruction where the present invention is used. Clock cycles may be saved if the instruction to fetch after the JUMP is not mispredicted.

Cycles 1 and 2 of FIG. 3 are similar to the corresponding cycles of FIG. 2. However, after the JUMP instruction has been fetched, the JUMP-PREDICTED-TAKEN signal is not activated as shown by signal Line 14. This results in the generation, during cycle 3, of the instruction address N+1 and the fetching of instruction A. In cycle 4, the instruction address generation selects the incremented address, N+2 and fetches instruction B.

As in the example illustrated in FIG. 2, the SKIP-TAKEN signal is raised in cycle 5 as a result of the Arithmetic stage 2X processing of the CONDITIONAL SKIP instruction. Because the condition evaluated to true, the JUMP instruction at address N should have been skipped and it must be removed from the Pipeline 10. Thus, Line 22 shows the JUMP instruction being aborted in the Arithmetic stage 2X of the Pipeline during cycle 5. By considering whether the instruction preceding the JUMP instruction was a CONDITIONAL SKIP instruction, two cycles are saved. Instead of no instructions completing in cycles 6, 7, and 8 as in the example of FIG. 2, only cycle 6 is empty for the present invention as illustrated in FIG. 3.

Figure 4:
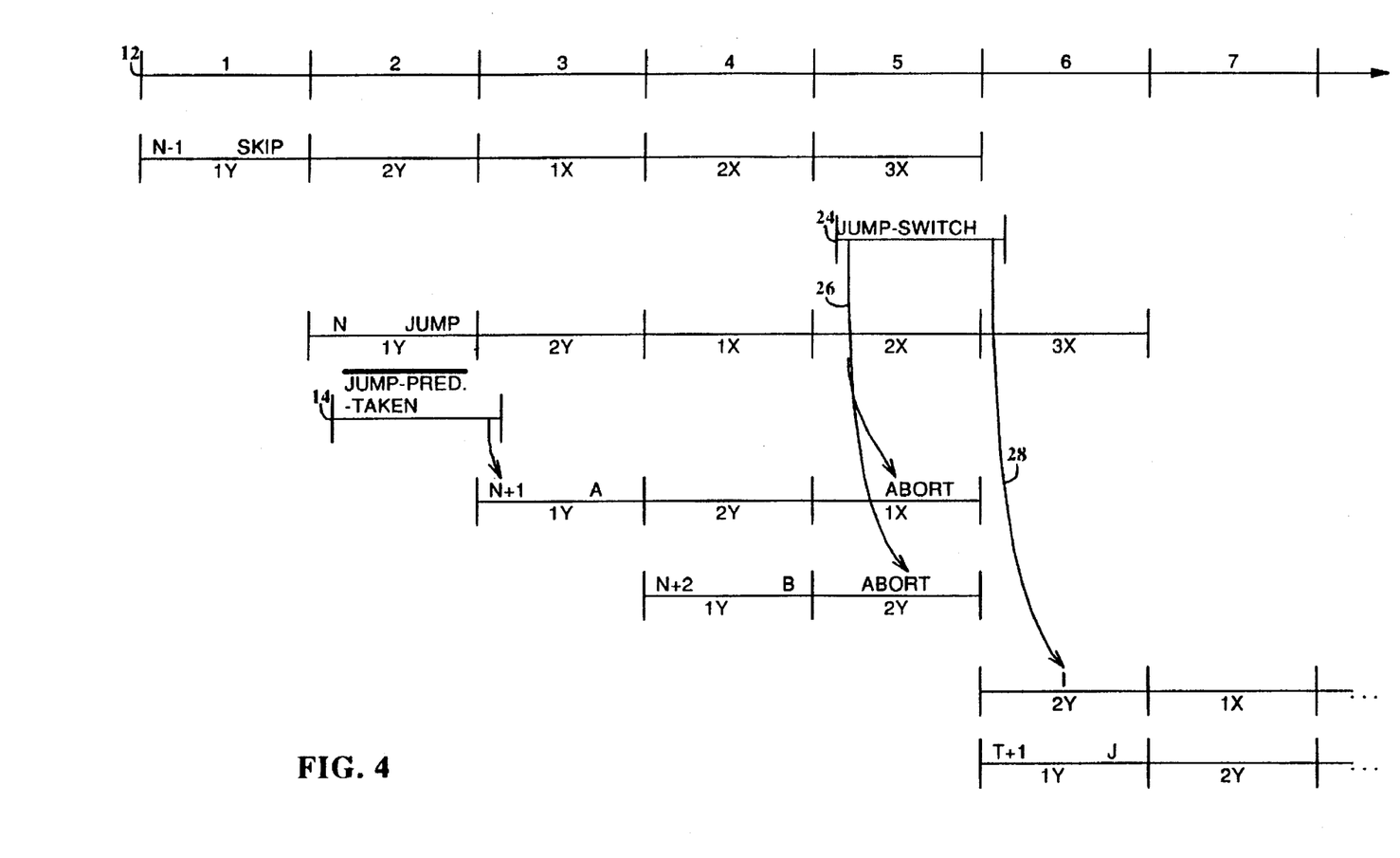
FIG. 4 is a timing diagram that illustrates the results of mispredicting the instruction to fetch following a SKIP/JUMP pair of instructions.

FIG. 4 is a timing diagram that illustrates the recovery from mispredicting the instruction to fetch following a SKIP/JUMP pair of instructions in the context of the present invention. In particular, if a SKIP instruction is fetched from address N−1 and processed, then a JUMP instruction is fetched from address N and processed, a prediction is made that the next instruction to fetch is at address N+1 and the prediction is wrong, two instructions will be aborted.

Cycles 1, 2, 3, and 4 of FIG. 4 are similar to the corresponding cycles in FIG. 3. FIG. 3 may be referenced for a description of these cycles. In contrast to the example of FIG. 3, during cycle 5 in FIG. 4, the JUMP-SWITCH signal is active as shown by Signal Line 24. This indicates that the condition in the SKIP instruction evaluated to false. Thus, the JUMP instruction that follows the SKIP instruction should be performed and the target address in the JUMP instruction contains the next instruction to fetch. Because the instruction A at address N+1 was predicted and fetched following the JUMP, it is aborted when it is in stage 1X of the Pipeline 10, and the following instruction B at address N+2 is aborted during its 2Y stage as shown by Line 26.

In correcting the misprediction, the JUMP-SWITCH signal is used in selecting the target address T for the next instruction to fetch. As shown by Line 28, the JUMP-SWITCH Signal 24 causes instruction I to be inserted in stage 2Y of the Pipeline 10 during cycle 6. Instruction I from address T (the target address of the JUMP instruction) is available because it was fetched during cycle 5 as an alternate to instruction A from address N+1. During cycle 5, the JUMP instruction in the 2X stage of processing. Instruction I at address T is fetched as the alternate because the jump prediction logic predicted that the instruction at address N+1 should be fetched. Had address T been predicted, instruction A at address N+1 would have been fetched as the alternate instruction. During cycle 6, address T+1 is generated and instruction J is fetched.

Because of the mispredicted JUMP, two clock cycles are lost. The cycles lost are cycle 7 and cycle 8. Instruction A that was fetched during cycle 3 from address N+1 was aborted in cycle 5. Had the prediction been correct, A would have completed in cycle 7. Instruction B that was fetched during cycle 4 from address N+2 was also aborted in cycle 5. Had the prediction been correct, B would have completed in cycle 8. Thus, the instructions that were to have completed in cycles 7 and 8 were aborted, and cycles 7 and 8 therefore have no instructions completing.

Figure 5:
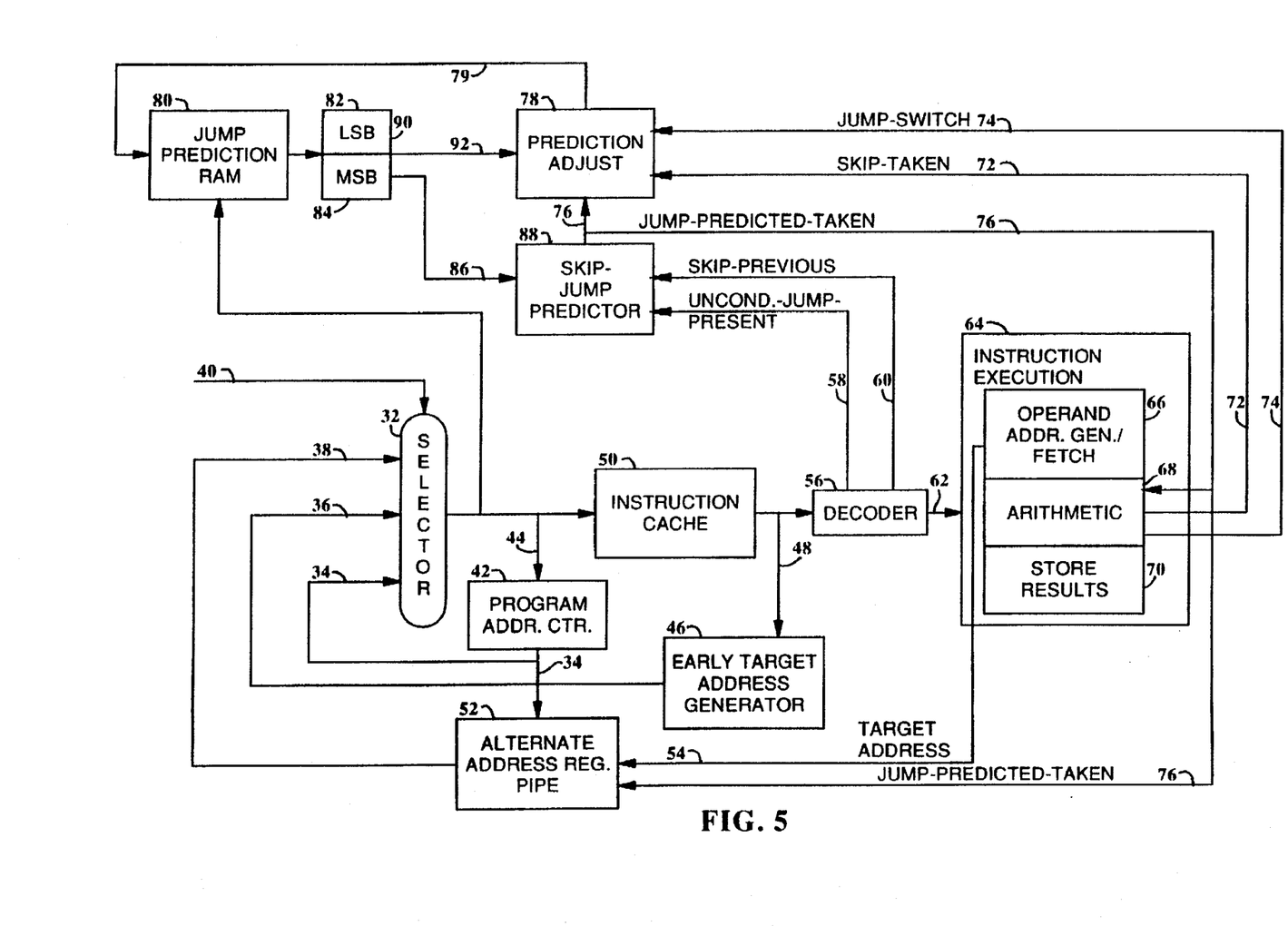
FIG. 5 is a block diagram of Skip-Jump logic in combination with jump prediction logic and instruction pipeline logic.

FIG. 5 is a block diagram of Skip-Jump logic in combination with jump prediction logic and instruction pipeline logic. The objective of the logic is to perform jump prediction in a pipeline instruction processor, taking into account whether the instruction preceding a JUMP instruction is a CONDITIONAL SKIP instruction.

Beginning with Selector 32, an instruction address for the next instruction to fetch is selected from three input address Lines 34, 36, and 38 based on control signals supplied by Line 40. The details of Control Line 40 will be discussed in further detail below. The instruction address on Line 34 is supplied by Program Address Counter 42. Program Address Counter 42 receives the output address from Selector 32 over Line 44 and increments the instruction address.

The instruction address on Line 36 is generated by the Early Target Address Generation logic 46. Early Target Address Generation logic receives an instruction over Line 48 as supplied by Instruction Cache 50. If the instruction received by Early Generation of Target Address logic is a JUMP instruction, the instruction address of the target of the jump is generated and supplied via Line 36.

An alternate address is provided to Selector 32 via Line 38 from the Alternate Address Register Pipe 52. The Alternate Address Register Pipe contains instruction addresses for purposes of recovering from mispredicting the instruction to follow a JUMP instruction. The Alternate Address Register Pipe has a register to store an alternate instruction address for the instruction in the Arithmetic stage 2X of the Pipeline 10 and a register to store an alternate instruction address for the instruction in the Store Results stage 3X of the Pipeline. The target address for an instruction is supplied via Line 54 to the Alternate Address Register Pipe, and the incremented address is supplied via Line 34. The Alternate Address Register Pipe selects between the two addresses.

Instruction Decoder 56 decodes the instruction provided on Line 48. If the instruction is an UNCONDITIONAL JUMP instruction, UNCONDITIONAL-JUMP-PRESENT signal Line 58 is activated to indicate that an UNCONDITIONAL JUMP instruction has been decoded. In addition, if the present instruction is an UNCONDITIONAL JUMP and the previously decoded instruction was a SKIP instruction, the SKIP-PREVIOUS signal Line 60 is activated. The SKIP-PREVIOUS signal Line 60 is activated during stage 2Y and remains active through stage 1X so as to coincide with the UNCONDITIONAL-JUMP-PRESENT signal on Line 58. The Instruction Decoder 56 sets a bit register when a SKIP instruction is encountered. Control signals for the decoded instruction are provided via Line 62 to the Instruction Execution logic 64.

Instruction Execution logic 64 contains the logic for the Operand Address Generation stage 1X, the Arithmetic stage 2X, and the Store Results stage 3X of the Pipeline 10. Block 66 corresponds to the Operand Address Generation stage 1X, Block 68 corresponds to the Arithmetic stage 2X, and Block 70 corresponds to the Store Results stage 3X.

In the Arithmetic logic 68, the SKIP-TAKEN and JUMP-SWITCH signals are generated as shown respectively by Lines 72 and 74. The SKIP-TAKEN signal is activated if the condition in a SKIP instruction evaluates to true and the JUMP-SWITCH signal depends upon the evaluated condition and the JUMP-PREDICTED-TAKEN signal on Line 76. The JUMP-SWITCH signal indicates that a the instruction to follow a JUMP instruction was predicted incorrectly, and therefore, the instruction address from the Alternate Address Register Pipe 52 should be selected as the next instruction to fetch for execution.

Control Line 40 uses the JUMP-PREDICTED-TAKEN signal 76, SKIP-TAKEN signal 72, and JUMP-SWITCH signal 74 to control the selection between the addresses on Lines 34, 36, and 38. If either the JUMP-SWITCH signal is active, or the JUMP-PREDICTED-TAKEN and SKIP-TAKEN signals are both active, the alternate address on Line 38 is selected; if the JUMP-PREDICTED-TAKEN signal is active and the SKIP-TAKEN signal is not active, the Target address on Line 36 is selected; in all other cases the incremented address on Line 34 is selected.

The Prediction Adjust logic 78 uses the SKIP-TAKEN signal 72, the JUMP-SWITCH signal 74, and the JUMP-PREDICTED-TAKEN signal 76 to generate new prediction bits to store, via Line 79, in the Jump Prediction RAM 80. The Jump Prediction RAM is addressed by the address provided on address Line 44. The Jump Prediction RAM contains a two-bit jump prediction counter that is maintained for an associated JUMP instruction. Even though a two-bit jump prediction counter is described herein, those skilled in the art will recognize that alternate means are available for performing jump prediction. The address of a JUMP instruction is used to obtain its jump prediction counter. Generally, if the Most Significant Bit (MSB) of the two-bit jump prediction counter for a JUMP instruction is set, then the target address specified by the JUMP instruction is selected as the next instruction to fetch. Register 82 illustrates a two-bit register for storing the two-bit jump prediction counter read from the Jump Prediction RAM.

The MSB 84 of the two-bit jump prediction counter Register 82 is provided via Line 86 to the Skip-Jump logic 88, and both the Least Significant Bit (LSB) 88 and MSB of the Register 82 are provided via Line 90 to the Prediction Adjust logic 78. Skip-Jump logic 88 uses the MSB signal from Line 86, the SKIP-PREVIOUS signal on Line 60, and the UNCONDITIONAL-JUMP-PRESENT signal on Line 58 to generate the JUMP-PREDICTED-TAKEN signal 76. The Skip-Jump logic considers both the jump prediction counter of a present JUMP instruction and whether the preceding instruction was a SKIP in generating the JUMP-PREDICTED-TAKEN signal. The JUMP-PREDICTED-TAKEN is one signal that determines the address selected by Selector 32.

Prediction Adjust logic 78 adjusts the two-bit jump prediction counter received from the two-bit jump prediction counter Register 82 according to whether the prediction of next instruction to fetch was correct. It accomplishes this by considering the JUMP-PREDICTED-TAKEN signal provided on Line 76, the SKIP-TAKEN signal provided on Line 72, and the JUMP-SWITCH signal provided on Line 74. If the prediction of the next instruction to fetch was correct, then an incremented two-bit jump prediction counter is written back to the Jump Prediction RAM 80. An incorrect prediction results in a decremented two-bit jump prediction counter being written to the RAM 80.

Figure 6:
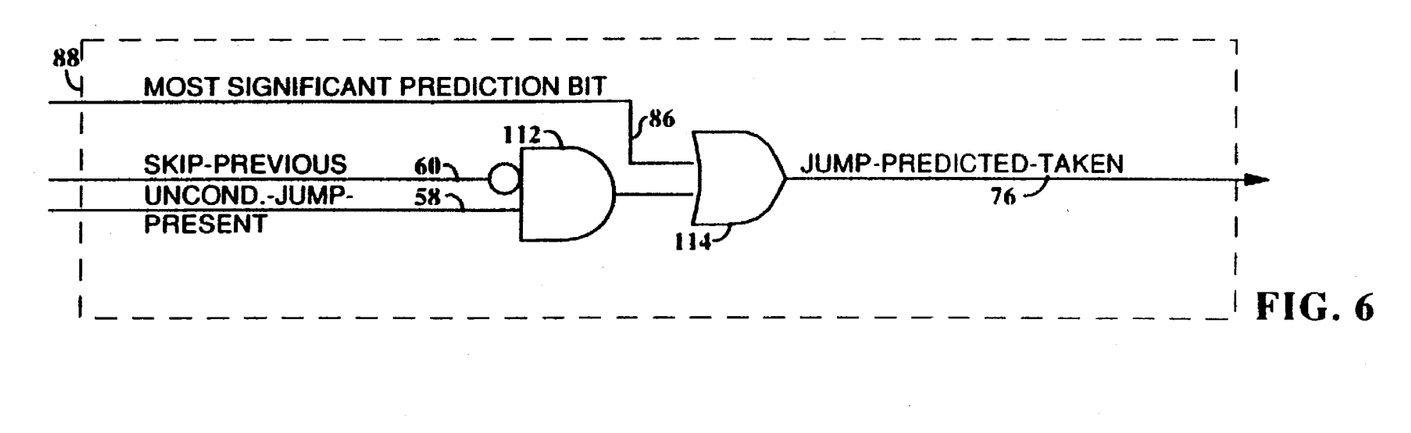
FIG. 6 is a logic block diagram that shows the Skip-Jump logic for generating the JUMP-PREDICTED-TAKEN signal.

FIG. 6 is a logic block diagram that shows the Skip-Jump logic for generating the JUMP-PREDICTED-TAKEN signal. The JUMP-PREDICTED-TAKEN signal is used in selecting the address of the next instruction to fetch at Selector 32, for generating the JUMP-SWITCH signal on Line 74, and for determining whether the two-bit jump prediction counter should be adjusted. If either the MSB signal on Line 86 is active or the output of AND Gate 112 is active, OR Gate 114 activates signal Line 76 to generate the JUMP-PREDICTED-TAKEN signal 76. The output signal from AND Gate 112 is activated if the preceding instruction was not a SKIP and the present instruction is an UNCONDITIONAL JUMP, i.e., if the SKIP-PREVIOUS signal is inactive and the UNCONDITIONAL-JUMP-PRESENT signal is active.

Figure 7:
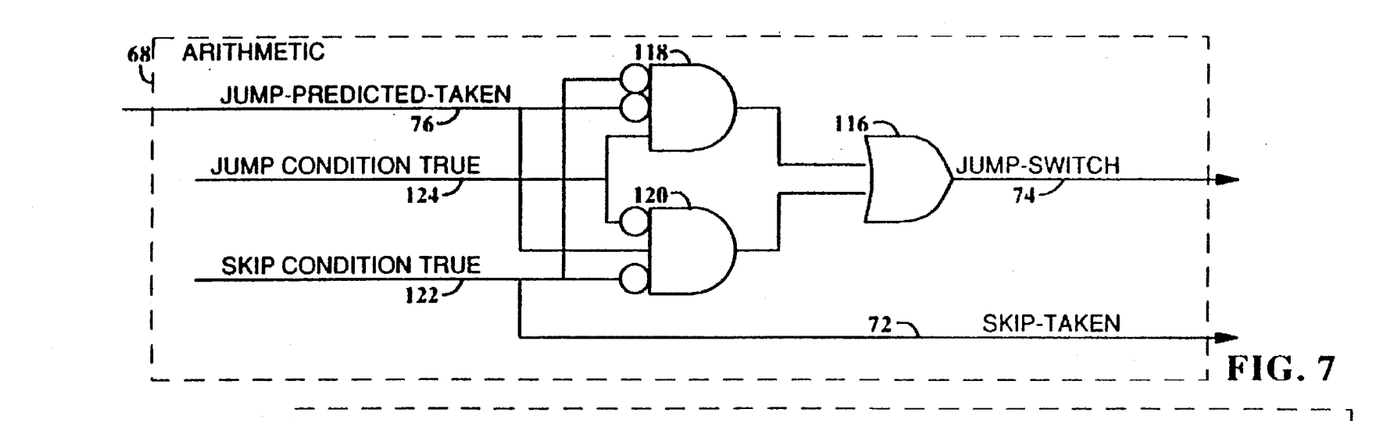
FIG. 7 is a logic block diagram that shows the Arithmetic logic for generating the JUMP-SWITCH and SKIP-TAKEN signals.

FIG. 7 is a logic block diagram that shows the Arithmetic logic for generating the JUMP-SWITCH and SKIP-TAKEN signals. The SKIP-TAKEN signal is active when the condition in a SKIP instruction evaluates to true. This indicates that the instruction following the SKIP should not be executed. The JUMP-SWITCH signal is activated on Line 74 by the output of OR Gate 116. OR Gate 116 receives as input, signals that are output from AND Gates 118 and 120. The output of AND Gate 118 is active when the JUMP-PREDICTED-TAKEN signal is not active and the condition in a SKIP instruction evaluates to false, as supplied via Line 122, and the condition in the present JUMP instruction evaluates to true as supplied via Line 124. The output of AND Gate 120 is active when the JUMP-PREDICTED-TAKEN signal is active, the condition in a SKIP instruction evaluates to false, and the condition in a JUMP instruction is evaluated false as indicated by Line 124.

Figure 8:
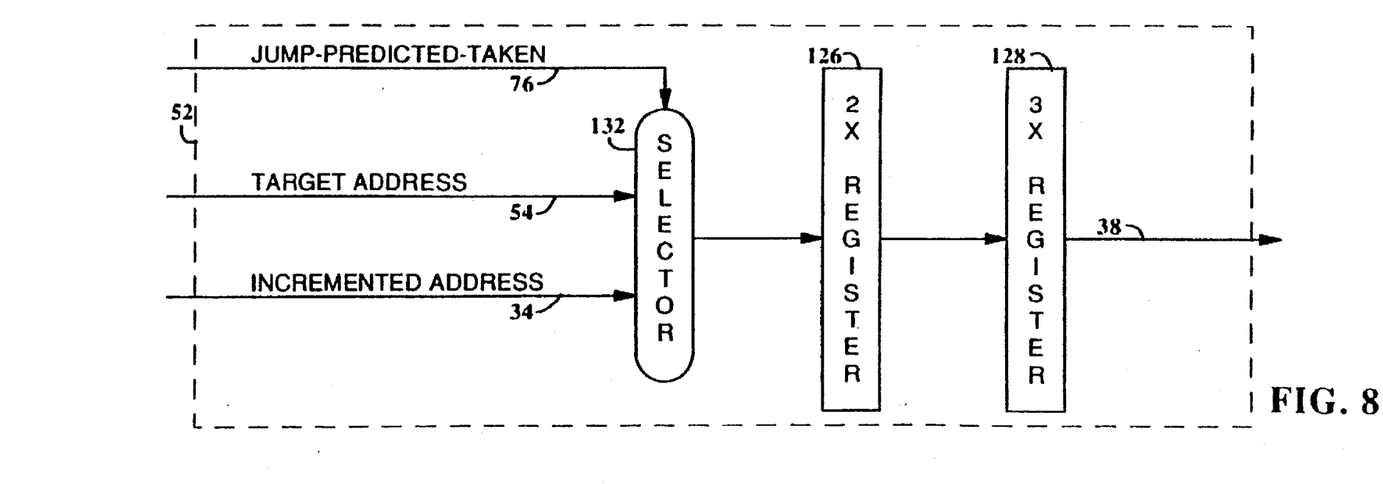
FIG. 8 is a block diagram of the Alternate Address Register Pipe.

FIG. 8 shows the logic for the Alternate Address Register Pipe 52. The Alternate Address Register Pipe is used to save alternate addresses for fetching an instruction if a jump prediction fails. For example, if the target of JUMP instruction is predicted and the instruction following the JUMP instruction should be executed instead (e.g., the condition in a CONDITIONAL JUMP is false, or the condition in a CONDITIONAL SKIP is true and the CONDITIONAL SKIP instruction is followed by a JUMP instruction) the address of the instruction following the JUMP must be made available for fetching the next instruction.

The Alternate Address Register Pipe contains a 2X Register 126 and a 3X Register 128. The 2X Register stores all alternate address for an instruction that is in the 2X stage of the Pipeline 10, and the 3X Register stores an alternate address for an instruction that is in the 3X stage of the Pipeline. The address stored in the 3X Register is available for selection on Line 38 if a prediction fails.

The Alternate Address Register Pipe receives two input addresses: the incremented address as supplied via Line 34 by Program Address Counter 42 and the target address as supplied via Line 54 from the 1X Stage of the Pipeline 10. Thus, the Alternate Address Register Pipe selects one of the two address to use as an alternate if jump prediction fails. The JUMP-PREDICTED-TAKEN signal on Line 76 provides control to Selector 132 to select between the two addresses. If the JUMP-PREDICTED-TAKEN signal is not active, the Target address tin Line 54 is selected. An active JUMP-PREDICTED-TAKEN signal causes the selection of the Incremented Address on Line 34.

Figure 9:
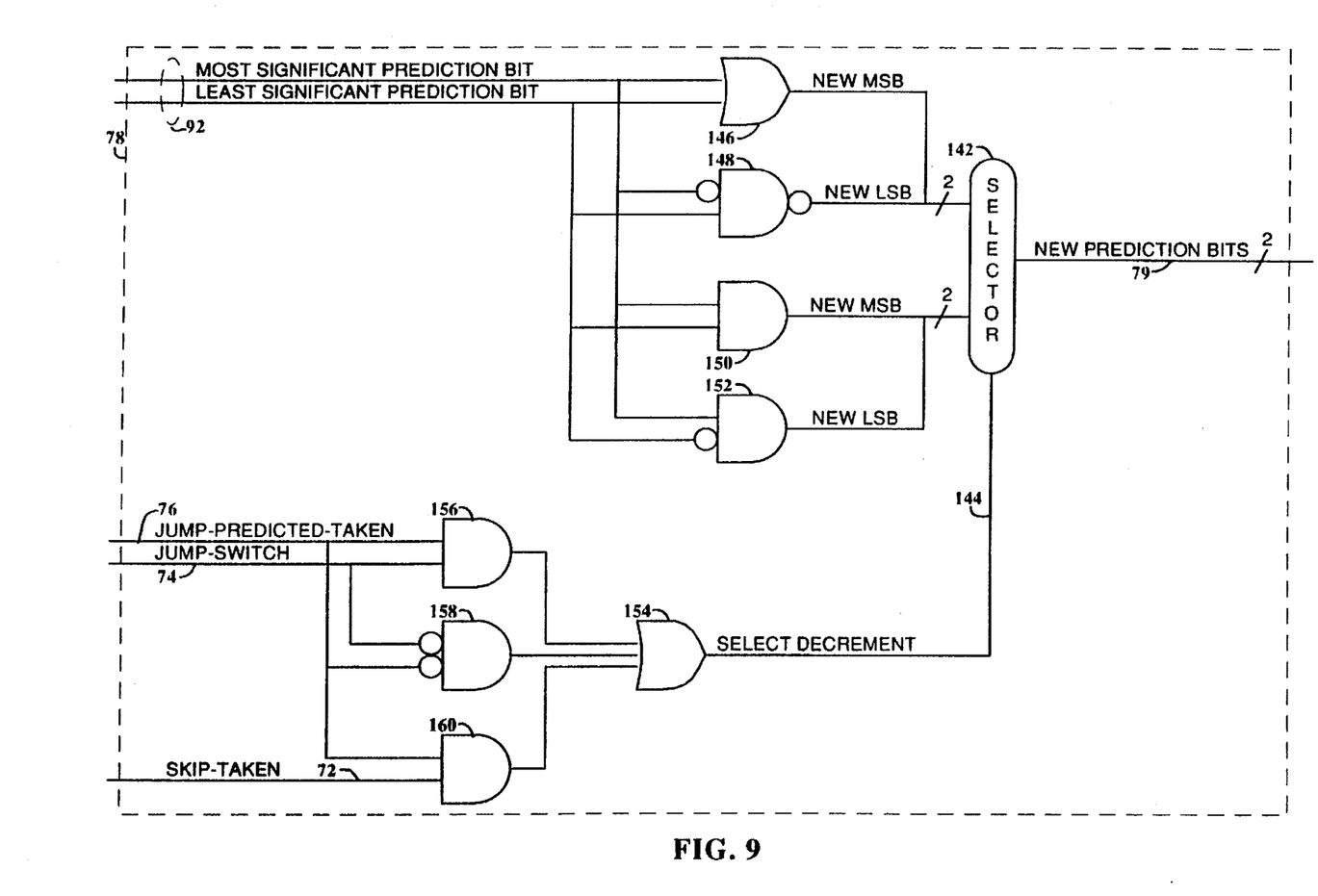
FIG. 9 is a logic block diagram that shows the Prediction Adjust logic for adjusting jump prediction.

FIG. 9 is a logic block diagram that shows the Prediction Adjust logic for adjusting jump prediction. Selector 142 of the Prediction Adjust logic selects between an incremented two-bit jump prediction counter and a decremented two-bit jump prediction counter based upon the Select Decrement signal on Line 144. OR Gate 146 and AND Gate 148 increment the two-bit jump prediction counter, with an upper limit of $11_2$. AND Gates 150 and 152 decrement the two-bit jump prediction counter, with a lower limit of $00_2$.

OR Gate 154 activates the Select Decrement signal on Line 144 if the output of either AND Gate 156, AND Gate 158, or AND Gate 160 is active. The output of AND Gate 156 is active if the JUMP-PREDICTED-TAKEN signal and JUMP-SWITCH signals are active; AND Gate 158 activates its output if the JUMP-PREDICTED-TAKEN signal and JUMP-SWITCH signals are both inactive: and AND Gate 160 activates its output if the JUMP-PREDICTED-TAKEN and the SKIP-TAKEN signals are both active.

We claim:

1. In a data processing system, an apparatus for predicting the address of an instruction to fetch from memory after a jump instruction has been fetched from address n, wherein the jump instruction specifies a target address at which a target instruction is stored, comprising:

a pipeline instruction execution unit;

an instruction fetch unit coupled to the memory and coupled to the pipeline instruction execution unit;

a skip detector coupled to said instruction fetch unit that detects that a skip instruction was fetched from address n−1 prior to fetching the jump instruction, wherein said skip instruction includes a condition to be evaluated by said pipeline instruction execution unit; and a jump predictor coupled to said instruction fetch unit and coupled to said skip detector, wherein said jump predictor generates a predicted address of an instruction to fetch after the jump instruction, said predicted address being the target address if, a recent execution of the jump instruction resulted in the target instruction being fetched and executed, and said predicted instruction address being n+1 if said skip detector detected a skip instruction, wherein said jump predictor is coupled to said pipeline instruction execution unit and includes a jump prediction designator for the jump instruction that is used to predict the instruction to fetch after the jump instruction, and wherein said jump prediction designator is adjusted such that said predicted instruction address will be n+1 if said skip detector detects a skip instruction and said condition is satisfied.

2. The apparatus of claim 1, further comprising a jump prediction RAM coupled to a prediction adjust unit, wherein said jump prediction RAM is addressed with the address of the jump instruction and said jump prediction designator is stored in said jump prediction RAM and is associated with the jump instruction, and said prediction adjust unit is coupled to said pipeline instruction execution unit, whereby said jump prediction designator is adjusted by said prediction adjust unit such that said predicted instruction address will be n+1 if said skip detector detects a skip instruction and said condition is satisfied.

3. The apparatus of claim 2, wherein said instruction fetch unit includes a program address counter;

a target address generator that generates the target address from the jump instruction prior to execution of the jump instruction by the pipeline instruction execution unit; and an instruction address selector coupled to said program address counter to receive an incremented instruction address and coupled to said target address generator, wherein said incremented instruction address is selected if said jump prediction designator does not designate said target address, and said target address is selected if said jump prediction designator designates said target address.

4. The apparatus of claim 3, further comprising an alternate address register pipe with output coupled to said instruction address selector and inputs coupled to said program address counter and said pipeline instruction execution unit, wherein said instruction address selector selects an output address from said alternate address register pipe if said predicted address is incorrect.

5. In a data processing system, an apparatus for predicting the address of an instruction to fetch from memory after a jump instruction has been fetched from address n, wherein the jump instruction specifies a target address at which a target instruction is stored, comprising:

a program address counter;

a target address generator that generates the target instruction address from the specified target address of the jump instruction before execution of the jump instruction;

a pipeline instruction execution unit;

a skip detector coupled to said pipeline instruction execution unit, said skip detector to provide a skip-previous signal in response to detecting that a skip instruction was fetched from address n−1 prior to fetching the jump instruction from address n, wherein said skip instruction includes a condition to be evaluated, and said pipeline instruction execution unit evaluates said condition and activates a skip-taken signal if said condition is satisfied;

a jump predictor responsive to said skip-previous signal from said skip detector, said jump predictor having a prediction register associated with the jump instruction to store a jump-prediction signal indicative of the jump instruction history, said jump predictor providing a jump-predicted-taken signal if said jump-prediction signal is active or said skip-previous signal is inactive;

an instruction address selector with its output circuit coupled to the memory and its input circuits coupled to said program address counter and said target address generator, and responsive to said jump-predicted-taken signal from said jump predictor and responsive to said skip-taken signal from said pipeline instruction execution unit, wherein the target address is selected only if said jump-predicted-taken signal is active and said skip-taken signal is inactive.

6. The apparatus of claim 5, further comprising:

a jump prediction RAM with output coupled to said prediction register and input coupled to said program address counter, wherein said jump prediction RAM stores a prediction counter that is associated with the jump instruction;

a prediction adjust unit with output coupled to said jump prediction RAM, wherein said prediction adjust unit is responsive to said skip-taken signal from said pipeline instruction execution unit and responsive to said jump-predicted-taken signal from said jump predictor, wherein said prediction counter is decremented if said jump-predicted-taken signal and said skip-taken signal are active.

7. The apparatus of claim 6, further comprising:

an alternate address register pipe with output coupled to said instruction address selector and inputs coupled to said program address counter and said pipeline instruction execution unit, wherein said alternate address register pipe is responsive to said jump-predicted-taken signal and selects a target address from said pipeline instruction execution unit if said jump-predicted-taken signal is inactive and selects an address from said program address counter if said jump-predicted-taken signal is active;

wherein said instruction address selector is responsive to a jump-switch signal from said pipelined instruction execution that is activated if either said jump-predicted-taken signal is active and said condition is not satisfied, or said jump-predicted-taken signal is inactive and said condition is satisfied, and said instruction address selector selecting an address from said alternate address register pipe if said jump-switch signal is active, or said skip-taken and said jump-predicted-taken signals are both active;

wherein said prediction counter is decremented if said jump-predicted-taken signal and said jump-switch signal are both active, or said jump-predicted-taken signal and said jump-switch signal are both inactive.

8. In a data processing system, an apparatus for predicting the address of an instruction to fetch from memory after a jump instruction has been fetched from address n, wherein the jump instruction specifies a target address at which a target instruction is stored, comprising:

an instruction cache;

an instruction decoder with input coupled to said instruction cache, wherein said instruction decoder activates a jump signal upon decoding the jump instruction and a skip-previous signal if a skip instruction was fetched from address n−1 prior to fetching the jump instruction, wherein said skip instruction includes a condition to be evaluated a pipeline instruction execution unit with input coupled to said instruction decoder;

an instruction address selector with output coupled to said instruction cache;

a program address counter with output coupled to said instruction address selector and input coupled to said instruction address selector;

a target address generator that generates the target address from the target address specified by the jump instruction before execution of the jump instruction, wherein input of said target address generator is coupled to said instruction cache;

an alternate address register pipe with output coupled to said instruction address selector and inputs coupled to said program address counter and said pipeline instruction execution unit;

a jump prediction RAM coupled to output of said instruction address selector;

a prediction register with input coupled to said jump prediction RAM;

a jump predictor coupled to said prediction register and responsive to said jump signal and said skip-previous signal from said instruction decoder, wherein a jump predicted-taken signal is activated if a most significant bit from said prediction register is set or said skip-previous signal is inactive; and a jump prediction adjustment unit responsive to said jump-predicted-taken signal, said jump-switch signal, and said skip-taken signal and including a prediction bits selector with output coupled to said jump prediction RAM and with inputs coupled to increment logic and decrement logic, wherein said increment logic and said decrement logic have input coupled to said prediction register, said prediction-bits selector selects output of said decrement logic if said skip-taken and said jump-predicted-taken signals are active, or said jump-predicted-taken and said jump-switch signals are both inactive, or said jump-predicted-taken and said jump-switch signals are both active.

9. In a data processing system having a pipeline instruction processor, a method for predicting the address of an instruction to fetch after a jump instruction has been fetched from address n, wherein the jump instruction specifies a target address at which a target instruction is stored, and a jump prediction designator is associated with the jump instruction for designating whether to predict the target address, comprising the steps of:

detecting that a skip instruction was fetched from address n−1 prior to fetching the jump instruction, wherein said skip instruction includes a condition to evaluate;

fetching an instruction from address n+1 if the jump prediction designator does not designate the target address;

fetching the target instruction if the jump prediction designator designates the target address;

evaluating said condition of said skip instruction; and adjusting the jump prediction designator to designate address n+1 if said condition is satisfied.

10. In a data processing system having a pipeline instruction processor, a method for predicting the address of an instruction to fetch after a jump instruction has been fetched from address n, wherein the jump instruction specifies a target address at which a target instruction is stored, and the processor includes a jump prediction RAM that includes a jump prediction counter that is associated with the jump instruction, comprising the steps of:

detecting that a skip instruction was fetched from address n−1 prior to fetching the jump instruction, wherein said skip instruction includes a condition to evaluate;

fetching an instruction from address n+1 if the most significant bit of the jump prediction counter is clear;

saving the target address in an alternate address register if said instruction from address n+1 is fetched;

fetching the target instruction if the most significant bit of the jump prediction counter is set;

saving address n+1 in said alternate address register if said target instruction is fetched;

evaluating said condition of said skip instruction;

incrementing the jump prediction counter if said condition is not satisfied;

decrementing the jump prediction counter if said condition is satisfied;

aborting said instruction from address n+1 if said condition is not satisfied; and fetching the target instruction saved in said alternate address register if said condition is not satisfied.

* * * * *